Patented June 1, 1943

2,320,819

UNITED STATES PATENT OFFICE 2,320,819

REACTION PRODUCTS OF ALDEHYDES AND BIS-DIAMINO TRIAZINYL DISULPHIDES

Gaetano F. D'Alelio and James W. Underwood, Pittsfield, Mass., assignors to General Electric Company, a corporation of New York No Drawing. Application January 20, 1942, Serial No. 427,526

19 Claims. (Cl. 260—42)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, etc., and a compound corresponding to the following general formula:

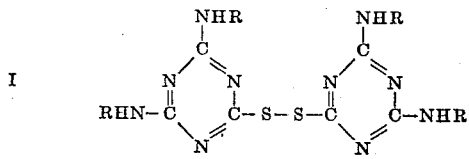

In the above formula R represents a member of the class consisting of hydrogen and monovalent hydrocarbon and substituted hydrocarbon radicals, more particularly halo-hydrocarbon radicals. Illustrative examples of radicals that R may represent are: aliphatic (e. g., methyl, ethyl, propyl, isopropyl, allyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, iso-propylphenyl, allylphenyl, 2-butenylphenyl, tertiary-butylphenyl, etc.); aryl-substituted aliphatic (e. g., benzyl, phenylethyl, phenylisopropyl, cinnamyl, etc.); and their homologues, as well as hydrocarbon radicals with one or more of their hydrogen atoms substituted by chlorine, bromine, fluorine or iodine, for example the chloro-, bromo-, fluoro- and iodo-substituted hydrocarbon radicals such as above-mentioned by way of illustration. Preferably R is hydrogen.

The nitrogenous organic compounds used in carrying the present invention into effect, and which are graphically illustrated in Formula I, are produced by first reacting a diamino [(—NHR)₂] mercapto 1,3,5-triazine (s-triazine) in an alkaline solution with bromine. An oxidation reaction takes place, yielding the hydrobromic acid salt of bis-(diamino[(—NHR)₂]s-triazinyl) disulphide. The bis-(diamino s-triazinyl) disulphide is obtained by treating the hydrobromide thereof with an equal molar quantity of an alkali, for example sodium hydroxide. For further information on the preparation of bis-(diamino s-triazinyl) disulphide, see Beilstein, 4th edition, 26, 272.

The present invention is based on our discovery that new and valuable materials of particular utility in the plastics and coating arts can be produced by effecting reaction between ingredients comprising essentially an aldehyde, including polymeric aldehydes, hydroxyaldehydes and aldehyde-addition products, and a bis-(diamino triazinyl) disulphide. The cured resins are outstanding in their resistance to water and organic solvents. Surprisingly, too, the gloss and general appearance of molded articles made from molding compounds containing these new resins in heat-convertible state are much superior to articles similarly molded from molding compositions containing resins produced by reaction of an aldehyde with other amino triazinyl thio compounds such, for example, as thioammeline, bisthioammeline polyalkylene ethers, hydroxyaliphatic thioammeline ethers, etc. Other properties, including resistance to abrasion and heat and curing characteristics, of our new resinous materials also are better than the prior resinous reaction products of an aldehyde and an amino triazinyl thio compound. These improved properties make the products of the present invention suitable for use in fields of utility, for instance in electrically insulating applications, for which resinous materials of lesser resistance to heat, water, abrasion and organic solvents would be entirely unsuited.

It has been known heretofore that resinous materials can be prepared by reaction of an aldehyde with certain amino triazinyl thio compounds, specifically thioammeline, bisthioammeline polyalkylene ethers and hydroxyaliphatic thioammeline ethers. While such resins are suitable for numerous industrial applications, they are not entirely satisfactory for some uses where optimum heat-, water- and abrasion-resistance are required. Furthermore, in some cases their curing characteristics are inadequate for the high-speed molding technique required for economical molding operations. These and other production difficulties and deficiencies in useful properties of the resin are obviated by creating a synthetic composition from an aldehyde and a bis-diamino s-triazinyl) disulphide corresponding to the general formula hereinbefore given.

In carrying our invention into effect the initial condensation reaction may be carried out at normal or at elevated temperatures, at atmospheric, sub-atmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. In some cases it is desirable to cause the initial condensation reaction to take place in the presence of a primary condensation catalyst and a secondary condensation catalyst. The primary catalyst advantageously is either an aldehyde-nonreactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulphuric, phosphoric, acetic, lactic, acrylic, malonic, etc., or acid salts such as sodium acid sulphate, monosodium phosphate, monosodium phthalate, etc. Mixtures of acids, of acid salts or of acids and of acid salts may be employed if desired.

The reaction between the aldehyde, e. g., formaldehyde, and the bis-(diamino triazinyl) disulphide may be carried out in the presence of solvents or diluents, fillers, other natural or synthetic resinous bodies, or while admixed with other materials that also can react with the aldehydic reactant or with the disulphide, e. g., ketones, urea (NH₂CONH₂), thiourea, selenourea, iminourea (guanidine), substituted ureas, thioureas, selenoureas and iminoureas, numerous examples of which are given in various copending applications of one of us, for instance in D'Alelio copending application Serial No. 363,037, filed October 28, 1940; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aminodiazines; amino-triazines other than the bis-(diamino triazinyl) disulphides, e. g., melamine, ammeline, ammelide, melem, melam, melon, numerous other examples being given in various copending applications of one or both of us, for instance in D'Alelio copending application Serial No. 377,524, filed February 5, 1941, and in applications referred to in said copending application; phenol and substituted phenols, e. g., the cresols, the xylenols, the tertiary alkyl phenols and other phenols such as mentioned in D'Alelio Patent No. 2,239,441; monohydric and polyhydric alcohols, e. g., butyl alcohol, amyl alcohol, ethylene glycol, glycerine, polyvinyl alcohol, etc.; amines, including aromatic amines, e. g., aniline, etc.; and the like.

The modifying reactants may be incorporated with the disulphide and the aldehyde by mixing all the reactants and effecting condensation therebetween or by various permutations of reactants as described, for example, in D'Alelio and Holmes Patent No. 2,263,289 with particular reference to reactions involving a non-nitrated urea, an aliphatic aldehyde and a nitrated urea, specifically nitrourea (page 2, column 1, lines 71–75, column 2, lines 1–22). For instance, we may form a partial condensation product of ingredients comprising (1) urea or melamine or urea and melamine, (2) a disulphide of the kind herein described (for example, bis-diamino s-triazinyl) disulphide, bis-[di-(methylamino) s-triazinyl] disulphide, bis-[di-(anilino) s-triazinyl] disulphide, etc.) and (3) an aldehyde, including polymeric aldehydes, hydroxyaldehydes and aldehyde-addition products, for instance formaldehyde, paraformaldehyde, glyceraldehyde, dimethylol urea, a polymethylol melamine, e. g., hexamethylol melamine, etc., and thereafter effect reaction between this partial condensation product and, for example, a curing reactant, specifically a chlorinated acetamide, to obtain a heat-curable composition. The curing reactant accelerates the cure of the resin and improves its resistance to water. Direct or active curing catalysts and latent curing catalysts also accelerate the conversion of the heat-convertible or potentially heat-convertible resin to a cured state and improve its water resistance. The curing agents may be omitted, if desired, when rapidity of cure of the thermosetting resin and the water resistance of the cured resin are of secondary consideration.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting condensation products, alone or mixed with fillers, pigments, dyes, lubricants, plasticizers, curing agents, etc., may be used, for example, in the production of molding compositions.

The heat-curable resinous condensation products of this invention show excellent flow characteristics during a short curing cycle. This is a property that is particularly desirable in a molding compound. The molded articles have a high dielectric strength and excellent resistance to arcing. They have an excellent surface finish and exceptionally high resistance to water, organic solvents and abrasion.

The liquid intermediate condensation products of this invention may be concentrated or diluted further by the removal or addition of volatile solvents to form liquid coating compositions of adjusted viscosity and concentrations. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how this invention may be carried into effect, the following examples are given by way of illustration. All parts are by weight.

*Example 1*

| | Parts |
|---|---|
| Bis-(diamino s-triazinyl) disulphide | 28.4 |
| Aqueous formaldehyde (approx. 37.1% HCHO) | 32.4 |
| Aqueous solution of sodium hydroxide (0.46 N) | 1.5 | were heated together under reflux at the boiling temperature of the mass for 15 minutes. A molding (moldable) compound was made by mixing the resulting liquid partial condensation product with 20.3 parts alpha cellulose in flock form and 0.2 part of a mold lubricant, specifically zinc stearate. The wet molding composition was dried at room temperature until sufficient moisture had been removed to provide a material that could be molded satisfactorily. A sample of the dried and ground molding compound was molded into the form of a disk, using a molding time of 3 minutes, a temperature of 135° C. and a pressure of 2,000 pounds per square inch. A well-molded product having a well-knit surface and a high resistance to heat was obtained. The incorporation of chloroacetamide or other curing agent into the resinous partial condensation product, either prior to or during the formation of the molding compound, accelerates the cure of the resin under the heat and pressure of molding and yields molded articles of improved water resistance.

*Example 2*

| | Parts |
|---|---|
| Bis-(diamino s-triazinyl) disulphide | 8.5 |
| Urea | 7.2 |
| Aqueous formaldehyde (approx. 37.1% HCHO) | 48.6 |
| Aqueous solution of sodium hydroxide (0.46 N) | 5.0 |
| Chloroacetamide (monochloroacetamide) | 0.3 |

All of the above ingredients with the exception of the chloroacetamide were heated together under reflux at the boiling temperature of the mass for 20 minutes. The chloroacetamide was now added and refluxing was continued for an additional 1 minute to cause the chloroacetamide to intercondense with the partial condensation product of the urea, disulphide and formaldehyde. The hot resinous syrup was mixed with 21.5 parts alpha cellulose and 0.2 part zinc stearate to form a molding compound. The wet molding composition was dried as described under Example 1. A well-cured molded disk having good water resistance, excellent cohesive properties and a homogeneous and well-knit structure was produced by molding a sample of the dried and ground molding compound for 3 minutes at 135° C. under a pressure of 2,000 pounds per square inch. The molding composition showed good plastic flow during molding.

Instead of using chloroacetamide in accelerating the curing of the potentially reactive resinous material, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha beta dibromopropionitrile, aminoacetamide hydrochloride, ethylene diamine monohydrochloride, the ethanolamine hydrochlorides, nitrourea, chloroacetyl urea, chloroacetone, glycine, sulphamic acid, citric diamide, phenacyl chloride, etc.). Other examples of active and latent curing catalysts and of curing reactants that may be employed to accelerate or to effect the curing of the thermosetting or potentially thermosetting resins of this and other examples are given in various copending applications of one or both of us, for instance in D'Alelio copending applications Serial No. 346,962, filed July 23, 1940, and Serial No. 354,395, filed August 27, 1940, both of which applications are assigned to the same assignee as the present invention.

*Example 3*

| | Parts |
|---|---|
| Bis-(diamino s-triazinyl) disulphide | 22.7 |
| Para-toluene sulphonamide | 3.4 |
| Aqueous formaldehyde (approx. 37.1% HCHO) | 32.4 |
| Aqueous solution of sodium hydroxide (0.46 N) | 5.0 | were heated together under reflux at the boiling temperature of the mass for 9 minutes, yielding a resinous syrup that hardened rapidly when a small sample of it was heated on a 140° C. hotplate. The syrupy condensation product was mixed with 19.6 parts alpha cellulose and 0.2 part zinc stearate. The resulting composition was dried at room temperature. Forty (40) parts of the dried composition was mixed with 0.5 part chloroacetamide and a sample of the resulting mixture was molded into the form of a disk, using a molding time of 3 minutes, a temperature of 135° C. and a molding pressure of 2,000 pounds per square inch. The molded disk was well cured throughout and had a homogeneous and well-knit structure. The molded article had very good resistance to water, as shown by the fact that it absorbed only 1.4% by weight of water when immersed in boiling water for 15 minutes, followed by immersion in cold water for 5 minutes.

*Example 4*

| | Parts |
|---|---|
| Bis-(diamino s-triazinyl) disulfide | 28.5 |
| Dimethyl urea (commercial grade containing approx. 11% by weight of water) | 40.4 |
| Aqueous solution of sodium hydroxide (0.46 N) | 5.0 |
| Water | 50.0 |
| Chloroacetamide | 0.5 |

All of the above ingredients with the exception of the chloroacetamide were heated together under reflux at the boiling temperature of the mass for 15 minutes. The resulting syrupy condensation product was mixed with 23 parts alpha cellulose and 0.2 part zinc stearate. The wet compound was dried at room temperature. The dried material was mixed with the above-stated amount of chloroacetamide. A sample of the resulting molding compound was molded for 3 minutes at 135° C. under a pressure of 2,000 pounds per square inch. The molded piece was well cured and had a well-knit surface. The molded article had excellent resistance to water.

It absorbed only 0.65% by weight of water when tested for its water-resistance characteristics as described under Example 3. The molding compound showed excellent plastic flow during molding, as evidenced by the amount of flash on the molded piece.

*Example 5*

A phenol-formaldehyde liquid partial condensation product was prepared by heating together 90 parts phenol and 195 parts of an aqueous formaldehyde solution containing approximately 37.1% HCHO for 4 hours at 65° to 70° C., using 2.85 parts potassium carbonate as a condensation catalyst. This partial condensation product is described in the following formula as "phenolic resin syrup":

|   | Parts |
|---|---|
| Bis-(diamino s-triazinyl) disulphide | 1.9 |
| Phenolic resin syrup | 60.0 |
| Aqueous solution of sodium hydroxide (0.46 N) | 0.5 |
| Oxalic acid | 1.1 |

All of the above components with the exception of the oxalic acid were heated together under reflux at boiling temperature for 30 minutes. The oxalic acid dissolved in a small amount of water was now added to the reaction mass. A molding composition was made from the resulting syrupy condensation product by mixing it with 21 parts alpha cellulose and 0.2 part zinc stearate. The wet molding compound was dried at room temperature for about 16 hours. A sample of the dried and ground molding compound was molded for 3 minutes at 135° C. under a pressure of 2,000 pounds per square inch. The molded piece showed excellent cure and cohesive characteristics and marked resistance to water.

*Example 6*

|   | Parts |
|---|---|
| Bis-(diamino s-triazinyl) disulphide | 28.4 |
| Acrolein | 22.4 |
| Aqueous solution of sodium hydroxide (0.46 N) | 1.3 |
| Water | 50.0 | were heated together under reflux at the boiling temperature of the mass for 8 minutes. The resulting resinous syrup was potentially heat-curable, as shown by the fact that when sulfamic acid, citric acid, chloroacetamide and other curing agents such as mentioned under Example 2 were incorporated into samples of the syrup, followed by heating on a 140° C. hotplate, the individual samples cured to an infusible mass. The resinous material of this example is suitable for use in the production of molding compositions.

*Example 7*

|   | Parts |
|---|---|
| Bis-(diamino s-triazinyl) disulphide | 10.6 |
| Acetamide | 2.2 |
| Aqueous solution of sodium hydroxide (0.46 N) | 1.0 |
| Aqueous formaldehyde (approx. 37.1% HCHO) | 12.2 |

All of the above ingredients with the exception of the acetamide were heated together under reflux at the boiling temperature of the mass for 5 minutes. The stated amount of acetamide was now added and refluxing was continued for an additional 5 minutes. The resulting syrupy condensation product when tested for its curing characteristics by treating small samples of the syrup with monochloroacetamide, trichloroacetamide, sodium chloroacetate, sulphamic acid and other curing agents such as mentioned under Example 2, followed by heating on a 140° C. hotplate, yielded insoluble and infusible resinous masses. The curing rate was slower than that of resins similarly prepared in the absence of the acetamide. The resinous composition of this example is suitable for use as a modifier of less plastic resins and molding compositions and for controlling the curing characteristics of more rapidly curing aminoplasts. It also may be used in the preparation of thin, molded plastic materials, for example flexible covers and novelty articles that are made in thin cross-sections.

*Example 8*

|   | Parts |
|---|---|
| Bis-(diamino s-triazinyl) disulphide | 3.0 |
| Aqueous formaldehyde (approx. 37.1% HCHO) | 40.0 |
| Glycerine | 5.0 |
| Hydrochloric acid | Trace | were heated together under reflux at boiling temperature for 8 minutes, yielding a clear syrupy condensation product. The resinous syrup cured slowly to an infusible mass when a small sample was heated on a 140° C. hotplate. The curing rate was accelerated by the addition of chloroacetamide, sulphamic acid and other curing agents such as mentioned under Example 2 to the resin syrup, followed by heating at an elevated temperature, for example 130° to 160° C. A glass plate was coated with a small amount of the syrup, after which the coated plate was baked for several hours at 70° C. A hard, transparent, tightly adherent and water-resistant film was formed on the plate.

The resinous composition of this example is especially suitable for use in film-forming compositions. It also may be used advantageously as a modifier of rapidly curing aminoplasts to control their curing characteristics.

*Example 9*

|   | Parts |
|---|---|
| Bis-(diamino s-triazinyl) disulphide | 6.0 |
| Aqueous formaldehyde (approx. 37.1% HCHO) | 40.0 |
| Butyl alcohol | 40.0 |
| Aqueous solution of sodium hydroxide (0.46N) | 2.0 | were heated together under reflux at boiling temperature for a short period until the solution began to cloud. The syrup was filtered and the clear syrup was dehydrated on a hotplate. A sample of the dehydrated syrup was applied to a glass plate and the coated plate was baked for several hours at 70° C. The baked film was hard, translucent, water-resistant and adhered tightly to the glass surface.

The solubility and film-forming characteristics of the resinous composition of this example make it especially suitable for use in the production of spirit and baking varnishes. It may be used as a modifier of varnishes of the aminoplast and alkyd-resin types.

It will be understood, of course, by those skilled in the art that the reaction between the aldehyde and the disulphide may be effected at temperatures ranging, for example, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients of the above examples at boiling temperature under reflux as mentioned in the various examples, the reaction between the components may be carried out at temperatures ranging from room temperature up to the boiling temperature using longer reaction periods and, in some cases, stronger catalysts and higher catalyst concentrations at the lower temperatures.

It also will be understod, of course by those skilled in the art that our invention is not limited to condensation products obtained by reaction of ingredients comprising an aldehyde and the specific bis-(diamino triazinyl) disulphide named in the above illustrative examples. Thus, instead of bis-(diamino s-triazinyl) disulphide, the formula for which is

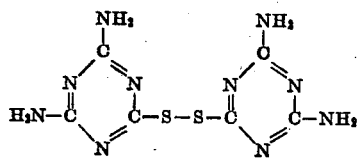

we may use any other disulphide of the kind embraced by Formula I, specific examples of which are listed below:

Bis-[di-(methylamino) s-triazinyl] disulphide
Bis-[di-(anilino) s-triazinyl] disulphide
Bis-[di-(chloroanilino) s-triazinyl] disulphide
Bis-[di-(allylamino) s-triazinyl] disulphide
Bis-[di-(ethylamino) s-triazinyl] disulphide
Bis-[di-(bromotoluido) s-triazinyl] disulphide
Bis-[di-(fluoroanilino) s-triazinyl] disulphide
Bis-[di-(phenylpropylamino) s-triazinyl] disulphide
Bis-[di-(isobutylamino) s-triazinyl] disulphide
Bis-[di-(dichloroanilino) s-triazinyl] disulphide
Bis-[di-(chloroethylamino) s-triazinyl] disulphide
Bis-[di-(iodotoluido) s-triazinyl] disulphide
Bis-[di-(3-butenylamino) s-triazinyl] disulphide
Bis-[(4,4'-dimethylamino 6,6'-di-o-tolylamino) s-triazinyl] disulphide
Bis-[(4,4'-dibenzylamino 6,6'-dixylidino) s-triazinyl] disulphide
Bis-[(4,4'-dicyclohexylamino 6,6'-dibutylamino) s-triazinyl] disulphide
Bis-[di-(cyclohexylamino) s-triazinyl] disulphide
Bis-[di-(cyclohexenylamino) s-triazinyl] disulphide
Bis-[di-(chlorocyclopentylamino) s-triazinyl] disulphide
Bis-[di-(phenylchloroethylamino) s-triazinyl] disulphide
Bis-[di-(cycloheptylamino) s-triazinyl] disulphide
Bis-[di-(naphthylamino) s-triazinyl] disulphide
Bis-[(4,4'-diamino 6,6'-dimethylamino) s-triazinyl] disulphide
Bis-[(4,4'-diamino 6,6'-dianilino) s-triazinyl] disulphide
Bis-[(4,4'-dimethylamino 6,6'-diethylamino) s-triazinyl] disulphide
Bis-[(4,4'-diamino 6,6'-dibenzylamino) s-triazinyl] disulphide
Bis-[di-(chlorobenzylamino) s-triazinyl] disulphide
Bis-[di-(bromonaphthylamino) s-triazinyl] disulphide
Bis-[di-(toluido) s-triazinyl] disulphide
Bis-[(4,4'-di-p-chloroanilino 6,6'-dinaphthylamino) s-triazinyl] disulphide Instead of the symmetrical triazine derivatives represented by Formula I, corresponding derivatives of the asymmetrical triazines or of the vicinal triazines may be employed.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, methacrolein, crotonaldehyde, benzaldehyde, glycollic aldehyde, glyceraldehyde, furfural, etc., mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives, more particularly the mono- and poly-methylol derivatives, of urea, thiourea, selenourea and iminourea, and of substituted ureas, selenoureas, thioureas and iminoureas (numerous examples of which are given in D'Alelio copending application Serial No. 377,524), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazoles, mono- and poly-(N-carbinol) derivatives of the aminodiazines, etc. Particularly good results are obtained with active methylene-containing bodies such as a methylol urea, more particularly mono- and di-methylol ureas, and a methylol melamine, e. g., mono-methylol melamine and polymethylol melamines (di-, tri-, tetra-, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the disulphide may be varied over a wide range. Ordinarily these reactants are employed in an amount corresponding to at least one mol of the aldehyde, specifically formaldehyde, for each mol of the disulphide. Thus, we may use, for example, from 1 to 10 or 12 mols or more of an aldehyde for each mol of the disulphide. When the aldehide is available for reaction in the form of an alkylol derivative, more particularly a methylol derivative such, for instance, as dimethylol urea, trimethylol melamine, etc., then higher amounts of such aldehyde-addition products are used, for instance from 2 or 3 up to 20 or 25 or more mols of such alkylol derivatives for each mol of the disulphide.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for instance, monohydric alcohols such as ethyl, propyl, isopropyl, isobutyl, hexyl, etc., alcohols; polyhydric alcohols such as diethylene glycol, triethylene glycol, pentaerythritol, etc.; amides such as formamide, stearamide, acrylamide, benzamide, toluene sulphonamides, benzene disulphonamides, benzene trisulphonamides, adipic diamide, phthalamide, etc.; amines such as ethylene diamine, phenylene diamine, etc.; phenol and substituted phenols, including aminophenols, etc.; ketones, including halogenated ketones; nitriles, including halogenated nitriles, e. g., acrylonitrile, methacrylonitrile, succinonitrile, chloroacetonitriles, etc.; acylated ureas, more particularly halogenated acylated ureas of the kind described, for example, in D'Alelio copending applications Serial No. 289,273, filed August 9, 1939, now Patent No. 2,281,559, issued May 5, 1942 and Serial No. 400,649, filed July 1, 1941, now Patent No. 2,294,873, issued September 1, 1942; and others.

The modifying bodies also may take the form of high molecular weight bodies with or without resinous characteristics, for example hydrolyzed wood products, formalized cellulose derivatives, lignin, protein-aldehyde condensation products, condensation products of an aldehyde with an aldehyde-reactable diazine, aminotriazole-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a triazinyl compound of the kind herein described and an aldehyde, e. g., formaldehyde, we may cause an aldehyde to condense with a salt (organic or inorganic) of the triazinyl compound or with a mixture of the triazinyl compound and a salt thereof. Examples of organic and inorganic acids that may be used in the preparation of such salts are hydrochloric, sulphuric, phosphoric, boric, acetic, chloroacetic, propionic, butyric, valeric, acrylic, polyacrylic, oxalic, methacrylic, polymethacrylic, malonic, succinic, adipic, malic, maleic, fumaric, benzoic, salicylic, phthalic, camphoric, etc.

Dyes, pigments, plasticizers, mold lubricants, opacifiers, curing agents and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What we claim as new and desire to secure by Letters Patent of the United States is:

1. A composition of matter comprising the reaction product of ingredients comprising an aldehyde and a compound corresponding to the general formula

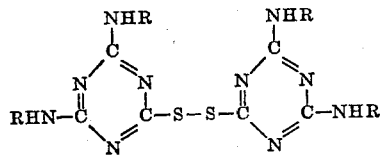

where R represents a member of the class consisting of hydrogen and monovalent hydrocarbon and halo-hydrocarbon radicals.

2. A composition as in claim 1 wherein the reaction product is the product obtained by effecting initial reaction between the specified components under alkaline conditions.

3. A composition as in claim 1 wherein the aldehyde is formaldehyde.

4. A composition comprising the resinous product of reaction of reactants including an aldehyde and bis-(diamino s-triazinyl) disulphide.

5. A heat-curable resinous composition comprising a heat-convertible condensation product of ingredients comprising formaldehyde and bis-(diamino s-triazinyl) disulphide.

6. A product comprising the heat-cured resinous composition of claim 5.

7. A composition comprising the product of reaction of ingredients comprising a urea, an aldehyde and a compound corresponding to the general formula

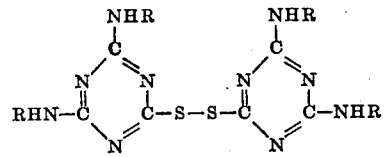

where R represents a member of the class consisting of hydrogen and monovalent hydrocarbon and halo-hydrocarbon radicals.

8. A composition as in claim 7 wherein the urea component is the compound corresponding to the formula $NH_2CONH_2$ and the aldehyde is formaldehyde.

9. A composition comprising the product of reaction of ingredients comprising an alcohol, an aldehyde and a compound corresponding to the general formula

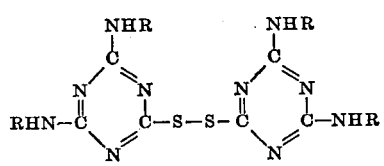

where R represents a member of the class consisting of hydrogen and monovalent hydrocarbon and halo-hydrocarbon radicals.

10. A heat-curable resinous composition comprising the heat-convertible resinous reaction product of (1) a partial condensation product of a mixture containing formaldehyde and bis-(diamino s-triazinyl) disulphide and (2) a curing reactant.

11. A resinous composition as in claim 10 wherein the curing reactant is a chlorinated acetamide.

12. A product comprising the heat-cured composition of claim 10.

13. A composition comprising the resinous product of reaction of ingredients comprising urea, formaldehyde and bis-(diamino s-triazinyl) disulphide.

14. A composition containing the resinous product of reaction of ingredients comprising dimethylol urea and bis-(diamino s-triazinyl) disulphide.

15. A composition comprising the resinous product of reaction of ingredients comprising melamine, formaldehyde and bis-(diamino s-triazinyl) disulphide.

16. A composition containing the resinous product of reaction of ingredients comprising a polymethylol melamine and bis-(diamino s-triazinyl) disulphide.

17. A composition comprising the resinous product of reaction of (1) a partial condensation product of ingredients comprising urea, formaldehyde and bis-(diamino s-triazinyl) disulphide, and (2) a chlorinated acetamide.

18. A composition comprising the resinous product of reaction of (1) a partial condensation product of ingredients comprising melamine, formaldehyde and bis-diamino s-triazinyl) disulphide, and (2) a chlorinated acetamide.

19. The method of preparing new synthetic compositions which comprises effecting reaction between ingredients comprising an aldehyde and a compound corresponding to the general formula

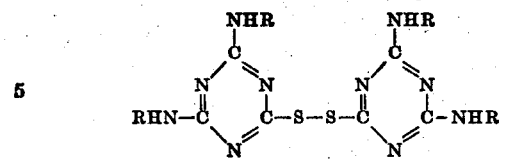

where R represents a member of the class consisting of hydrogen and monovalent hydrocarbon and halo-hydrocarbon radicals.

GAETANO F. D'ALELIO.
JAMES W. UNDERWOOD.